United States Patent  [10] Patent No.: US 9,245,147 B1
Williams et al.  [45] Date of Patent: Jan. 26, 2016

(54) STATE MACHINE REFERENCE MONITOR FOR INFORMATION SYSTEM SECURITY

(71) Applicants: Paul Irving Williams, Conroe, TX (US); Jason Scott Thacker, Breinigsville, PA (US)

(72) Inventors: Paul Irving Williams, Conroe, TX (US); Jason Scott Thacker, Breinigsville, PA (US)

(73) Assignee: White Badger Group, LLC, Breinigsville, PA (US)

( * ) Notice: Subject to any disclaimer, the term of this patent is extended or adjusted under 35 U.S.C. 154(b) by 81 days.

(21) Appl. No.: 14/168,684

(22) Filed: Jan. 30, 2014

Related U.S. Application Data

(60) Provisional application No. 61/758,751, filed on Jan. 30, 2013, provisional application No. 61/765,055, filed on Feb. 15, 2013.

(51) Int. Cl.
  G06F 7/04  (2006.01)
  G06F 21/62  (2013.01)

(52) U.S. Cl.
  CPC .................. G06F 21/6218 (2013.01)

(58) Field of Classification Search
  CPC .................................... G06F 21/6218
  See application file for complete search history.

(56) References Cited

U.S. PATENT DOCUMENTS

2003/0149888 A1* 8/2003 Yadav ............................ 713/200
2005/0015624 A1* 1/2005 Ginter et al. ................... 713/201

* cited by examiner

Primary Examiner — Nirav B Patel
Assistant Examiner — Mohammed Waliullah
(74) Attorney, Agent, or Firm — Osha Liang LLP

(57) ABSTRACT

A method and system for securing operating domains. The method includes receiving a captured communication, generating an event data record corresponding to the captured communication, where the event data record identifies a source system of the captured communication, a destination system of the captured communication, and an action to be performed at the destination system, where the action is obtained from the captured communication. The method further includes identifying a first state of an operating domain, where the state is a current active state of the operating domain and is associated with a state entry, making, using the state entry, a determination that the action is not permitted while the operating domain is in the state, and based on the determination, performing a state fault action.

16 Claims, 12 Drawing Sheets

| Event Data 260 | | | | | |
|---|---|---|---|---|---|
| Event ID 261 | Source System ID 262 | Destination System ID 263 | Action ID 264 | Action Arguments 265 | Time Stamp 266 |

FIG. 2C

| Event Data E1 | | | | | |
|---|---|---|---|---|---|
| Event ID | Source System ID | Destination System ID | Action ID | Action Arguments | Time Stamp |
| E1 | C | B | Heat-Turn-On | None | 10 |

| Event Data E2 | | | | | |
|---|---|---|---|---|---|
| Event ID | Source System ID | Destination System ID | Action ID | Action Arguments | Time Stamp |
| E2 | B | C | Heat-Status | On | 20 |

| Event Data E3 | | | | | |
|---|---|---|---|---|---|
| Event ID | Source System ID | Destination System ID | Action ID | Action Arguments | Time Stamp |
| E3 | C | B | Heat-Turn-Off | None | 30 |

| Event Data E4 | | | | | |
|---|---|---|---|---|---|
| Event ID | Source System ID | Destination System ID | Action ID | Action Arguments | Time Stamp |
| E4 | B | C | Heat-Status | Off | 40 |

| Event Data E5 | | | | | |
|---|---|---|---|---|---|
| Event ID | Source System ID | Destination System ID | Action ID | Action Arguments | Time Stamp |
| E5 | C | A | Valve-Open | None | 50 |

| Event Data E6 | | | | | |
|---|---|---|---|---|---|
| Event ID | Source System ID | Destination System ID | Action ID | Action Arguments | Time Stamp |
| E6 | A | C | Valve-Status | Open | 60 |

| Event Data E7 | | | | | |
|---|---|---|---|---|---|
| Event ID | Source System ID | Destination System ID | Action ID | Action Arguments | Time Stamp |
| E7 | C | B | Heat-Turn-On | None | 70 |

| Event Data E8 | | | | | |
|---|---|---|---|---|---|
| Event ID | Source System ID | Destination System ID | Action ID | Action Arguments | Time Stamp |
| E8 | B | C | Heat-Status | On | 80 |

FIG. 6F

STATE MACHINE REFERENCE MONITOR FOR INFORMATION SYSTEM SECURITY

CROSS-REFERENCE TO RELATED APPLICATIONS

This application claims priority under 35 U.S.C. §119 to U.S. Provisional Patent No. 61/758,751 filed on Jan. 30, 2013, which is hereby incorporated by reference in its entirety. This application claims priority under 35 U.S.C. §119 to U.S. Provisional Patent No. 61/765,055 filed on Feb. 15, 2013, which is hereby incorporated by reference in its entirety.

BACKGROUND

Large scale, geographically dispersed computer networks known as enterprise computer networks face inherent array of cyber security challenges, many of which are not applicable to smaller, single location networks.

SUMMARY

In general, in one aspect, the invention relates to non-transitory computer readable medium comprising instructions, which when executed by a processor perform method, the method comprising receiving a first captured communication, generating a first event data record corresponding to the first captured communication, wherein the first event data record identifies a source system of the first captured communication, a destination system of the captured communication, and an action to be performed at the destination system, wherein the action is obtained from the captured communication, identifying a first state of an operating domain, wherein the operating domain comprises at least one selected from a group consisting of the source system and the destination system, and wherein the first state is a current active state of the operating domain and is associated with a first state entry, making, using the first state entry, a first determination that the action is not permitted while the operating domain is in the first state, and based on the first determination, performing a state fault action.

In general, in one aspect, the invention relates to a state machine reference monitor, comprising a monitor port operatively connected to an operating domain, a processor, a memory comprising instructions, which when executed by the processor perform a method, the method comprising receiving a first captured communication via the monitor port, generating a first event data record corresponding to the first captured communication, wherein the first event data record identifies a source system of the first captured communication, a destination system of the captured communication, and an action to be performed at the destination system, wherein the action is obtained from the captured communication, identifying a first state of an operating domain, wherein the operating domain comprises at least one selected from a group consisting of the source system and the destination system, and wherein the first state is a current active state of the operating domain and is associated with a first state entry, making, using the first state entry, a first determination that the action is not permitted while the operating domain is in the first state, and based on the first determination, performing a state fault action.

Other aspects of the invention will be apparent from the following description and the appended claims.

BRIEF DESCRIPTION OF DRAWINGS

FIGS. 2A-2C show data structures and relationships between data structures in accordance with one or more embodiments of the invention.

FIG. 6A-6F show an example in accordance with one or more embodiments of the invention.

DETAILED DESCRIPTION

Figure 1:
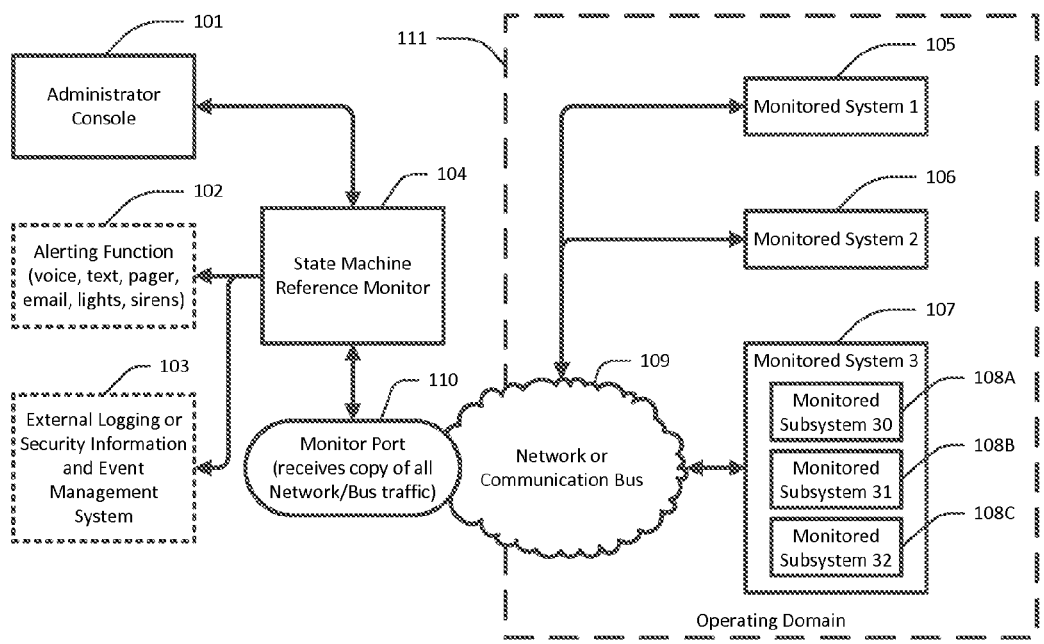
FIG. 1 shows a system in accordance with one or more embodiments of the invention.

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-7, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure. In general, embodiments of the invention relate to protecting individual systems, groups of systems, and/or subsystems within systems from cyber threats. More specifically, one or more embodiments of the invention provide a method for collecting and analyzing data collected one or more systems (and/or subsystems) and then using a finite state machine to determine whether the one or more systems (and/or subsystems) has been compromised. One or more embodiments of the invention provides the ability to perform real time analysis of collected data (including communications, commands, etc.) where such analysis occurs within the full and current context of other systems, as well as real world objects, systems, policies, procedures, and goals.

One or more embodiments of the invention, includes a method which may be used to detect unauthorized activity in sets of systems. The method may conceivably be implemented as either stand-alone tool, or as a module in a larger information security system. One use case would be to use the method to transparently add control and visibility to a system that may not support those features natively by implementing the method as a network proxy device. Another use case would be to implement the method in an existing Security Event and Information Management (SEIM) system to take advantage of such a system's existing data set and role in an organization. A third use case would be to implement the method in existing tools designed for various types of network analysis and forensic investigation purposes. The invention is not limited to the above use cases.

FIG. 1 shows a system in accordance with one or more embodiments of the invention. The system includes an Administrator Console 101, Optional Alerting Function 102, Optional External Logging or Security Information and Event Management System 103, State Machine Reference Monitor 104, Monitored System 1 105, Monitored System 2 106, Monitored System 3 107, Monitored Subsystem 3 108A, Monitored Subsystem 31 108B, Monitored Subsystem 31 108C, Network or Communication Bus 109, Monitor Port 110, and Operating Domain 111. Each of the aforementioned systems is described in detail below.

The number of monitored systems within the Operating Domain 111 may be an arbitrary number of one or greater. The number of monitored subsystems may also be an arbitrary number of zero or greater. The State Machine Reference Monitor corresponds to the implementation of the invention as software, hardware, or a combination thereof. In one or more embodiments of the invention, the Administrator Console 101 is an interface through which the administrator of the State Machine Reference Monitor may view system status, manage alerts, and manage the configuration of the State Machine Reference Monitor. In one or more embodiments of the invention, the Administrator Console may be implemented as either a standalone device or as a component part of the invention. In one or more embodiments of the invention, the optional Alerting Function 102 is a configurable output of the State Machine Reference Monitor that allows for the reporting of exception states to a predetermined destination, allowing for both direct alert notification and integration with external workflows. The optional External Logging or Security Information and Event Management System 103 is one or more external tools that may use various configurable output from the State Machine Reference Monitor 104 to perform further analysis, store historical data, execute various actions or workflows based on events, and/or facilitate other system integration functions.

In one or more embodiments of the invention, the State Machine Reference Monitor 104 is one or more finite state machines configured to mirror the configuration of the systems in the environment being monitored. The finite state machine, which may be implemented in software and/or in hardware, includes functionality to apply different sets of logic to various configured states on the monitored systems and/or monitored subsystems. The sets of logic may specify the conditions and rules for transitions between states. For example, if states A, B, and C configured, a transition from A to B may be allowed, but a transition from A directly to C may not be allowed. In the same example, Actions X, Y, and Z are allowed in state A, but only X is allowed in state B.

In one or more embodiments of the invention, a Monitored System represents a single unit of an object in the monitored environment, and scales based on the specific environment configuration, type of data being captured, and the level of detail desired. In one example, a typical corporate network, made of computers (clients and servers), printers, and other devices, each of the aforementioned would correspond to a Monitored System. In another example, where the invention (including the state machine reference monitor) is designed to be embedded within a single computer, major components of the computer architecture, such as central processing unit (CPU), memory controller, graphical processing unit (GPU), or network interface card (NIC) may each be considered a Monitored System. The invention is not limited to the above examples.

In one or more embodiments of the invention, a Monitored Subsystem is similar to a Monitored System, except for the distinction that a Monitored Subsystem is at least partially contained within a Monitored System. This may create a dependency relationship between the two, as well as a special relationship between multiple Monitored Subsystems contained within a single Monitored System. Specifically, Monitored Subsystems may be communicating between each other, and also up to their containing Monitored System, which makes their observable communications different than that of one or more Monitored Systems. Within the construct of Monitored Systems and Monitored Subsystems, actual implementations may include an arbitrary number of layers of containers, however the relationship between adjacent layers may be described as Monitored Systems and Monitored Subsystems in the context of the invention.

The following section describes examples of various implementations of one or more embodiments of the invention. The invention is not limited to these examples.

Example 1

In one embodiment of the invention, the Operating Domain 111 corresponds to an enterprise computer network within which each of the Monitored Systems 105-107, corresponds to a self-contained computer system, such as a mobile device, server, laptop, switch, router, wireless access point, or desktop computer. The Monitored Subsystems 108A-108C communicate with applications or other processes running within one or more of the monitored systems. Examples of those applications include database services (such as Oracle, DB2, or SQL Server), application services (such as IIS Active Server Pages, PHP, or Java), web servers (such as Apache or IIS), file servers (such as Windows SMB File Shares or File Transfer Protocol), and other similar services hosted within one of the aforementioned monitored systems. In this example, the applications executing on the individual monitored systems are monitored subsystems. The Network or Communication Bus 109 corresponds to a network that primarily uses (but is not limited to) Ethernet variants as a method for communication and primarily uses (but is not limited to) packet switching as the centralized means for distributing network traffic. The Monitored Subsystems 108A-108C communicate within the host system, and may also generate traffic on the Network or Communication Bus 109. The Monitored Systems 105-107 and Monitored Subsystems 108A-108C may communicate with each other, and may do so via the Network or Communication Bus 109. The Monitor Port 110 corresponds to one or more "span" or "monitor" ports within the Network or Communication Bus or a physical cable tap 109 configured such that all communications to and from the Monitored Systems 105-107 is effectively copied and output to the State Machine Reference Monitor 104. Typical communication traffic sent in this embodiment to the State Machine Reference Monitor 104 from the Monitor Port 110 would primarily include (but not be limited to) Transmission Control Protocol/Internet Protocol (TCP/IP) packets and other switched Ethernet management protocols.

Example 2

In another embodiment of the invention, the Operating Domain 111 corresponds to an industrial process control network such as Supervisory Control and Data Acquisition (SCADA) systems or Distributed Control System (DCS). Monitored Devices 105-107 correspond to remote terminal unit (RTU) systems and/or programmable logic controller (PLC) systems. Monitored Subsystems 108A-108C correspond to individual machines or controllers connected to RTU or PLC devices. The data collected by the monitor port 110 would be data packets of the MODBUS, IEC 60870-5, IEC 61850, Distributed Network Protocol 3 (DNP3), and/or Inter-Control Center Protocol (ICCP) types of protocols.

Example 3

In another embodiment of the invention, the Operating Domain 111 corresponds to a self-contained device, such as a server computer system. The Monitored Devices 105-107 correspond to various parts of the server's architecture, such as the central processing unit (CPU), memory controller, graphical processing unit (GPU), random access memory (RAM), network interface card (NIC), input/output controllers (I/O, such as Universal Serial Bus), and other related parts. The Network or Communication Bus corresponds to one or more systems buses that allow data and management communications among the aforementioned components, such as peripheral component interconnect (PCI) variants (including PCIe), InfiniBand, system management bus (SMBus) variants, inter-integrated circuit (I$^2$C), and other system buses. The Monitor Port 110 corresponds to a specialized hardware tap or other interception methods of one or more of the aforementioned buses, which copies all or part of the data from the buses to the State Machine Reference Monitor 104. For example, in if the bus is using PCIe for communication, then the Monitor Port may obtain transaction layer packets (TLPs). Monitored Subsystems 108A-108C correspond to one or more components contained within one of the major systems within the device, such as individual hard drives (monitored subsystems) connected to a storage controller (monitored system), a universal serial bus (USB) devices (monitored subsystems) connected to a USB I/O controller (monitored system), or other similarly arranged system components.

Generally speaking, the implementation may not require inclusion of every physical or logical device within an Operating Domain 111 to be fully monitored, leaving many opportunities for the optimization of a given implementation to monitor the fewest systems while still collecting enough data to allow for effective detection of malicious activity within the Operating Domain 111, as designed.

Figure 2A:
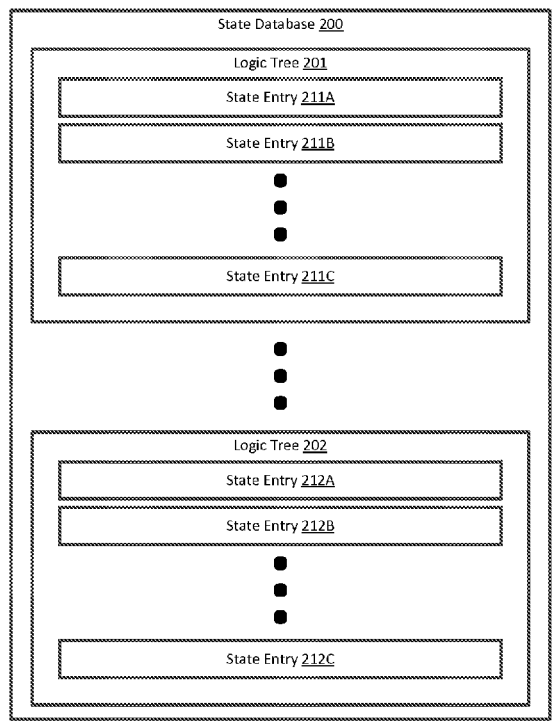
Figure 2B:
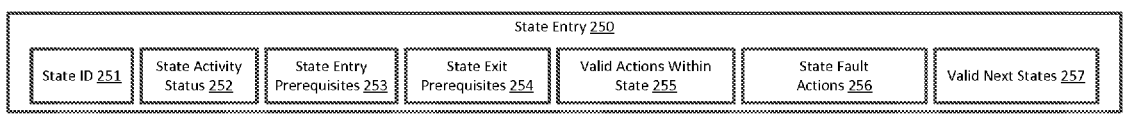

FIGS. 2A-2C show data structures and relationships between data structures in accordance with one or more embodiments of the invention.

Figure 6A:
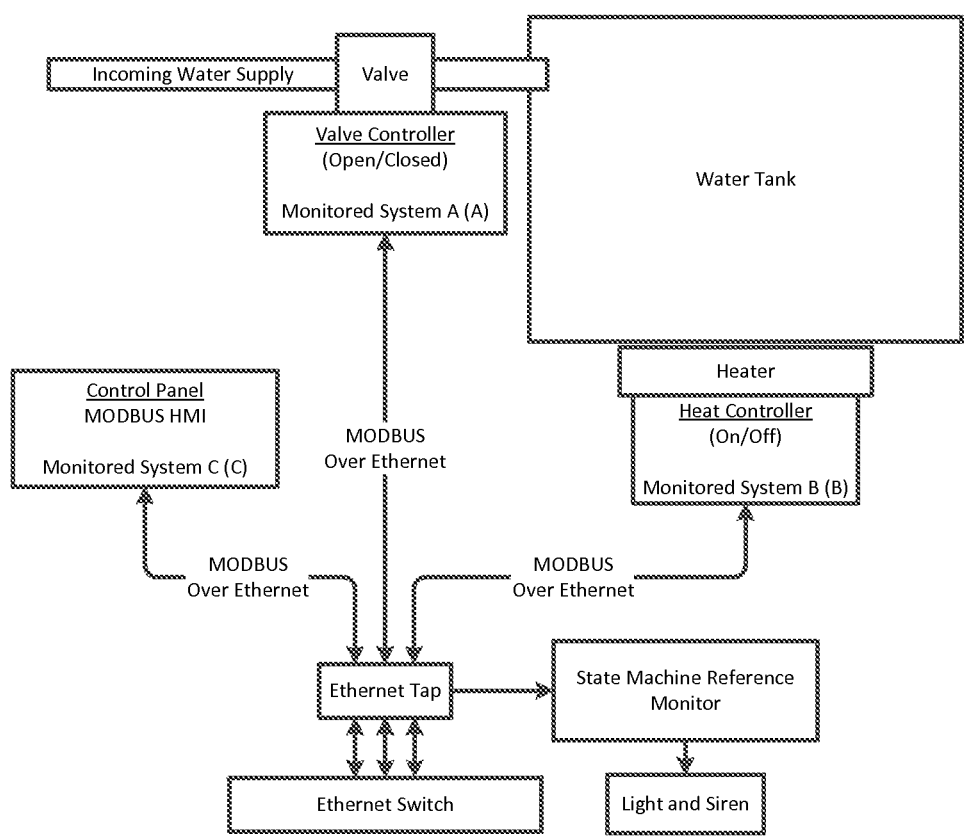
Figures 6B, 6C:
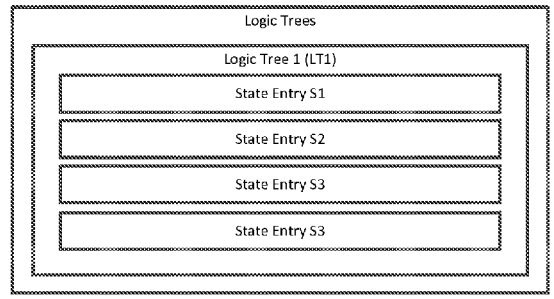

In one embodiment of the invention, the known system state database 308 includes some (or all) of the theoretical states of the operating domain (or portions thereof), stored in the data structures illustrated in FIGS. 2A and 2B. The state database 200 includes one or more collections of related state entries 250, in groups called logic trees 201-202. Each logic tree is includes states that form a contiguous, interconnected logical flow, defined as a set of states where every state is referenced as a valid next state 257 of at least one other state in the tree. An example of a logic tree is shown in FIG. 6B.

Referring to FIG. 2B, each entry in the state database 308 may include a number of fields describing various aspects of the state. This includes a State ID 251 to uniquely identify the state within the database; a State Activity Status 252 which marks each state as active, inactive, in transition, among other possibilities; a list of State Entry Prerequisites 253, which is a set of conditions that must be met before the state may become active; a list of State Exit Prerequisites 254, which is a set of conditions that must be met before the state may become inactive; a list of Valid Actions Within State 255, which is a set of actions that may be observed and allowed to occur without raising an alarm or executing any additional actions; a list of State Fault Actions 256, which is a set of actions to execute when an error is detected; and a list of Valid Next States 257, which is a set of other State IDs which may become active as the result of a state transition from the state described in the entry 250.

Referring to FIG. 2C, preprocessed and normalized event data may take the form of tokenized event data records illustrated in FIG. 2C. Each event data record 260 may include a unique Event ID 261, a Source System ID 262, a Destination System ID 263, an Action ID 264, Action Arguments 265, and a Time Stamp 266. The unique Event ID 261 is a number assigned in by the preprocessing step 302 or an external data source to allow for duplicate events to be identified and discarded, as well as to allow for the tracking of individual events through the remainder of the process. The Source System ID is an identifier for the system(s) that originated the original communication. Similarly, the Destination System ID 263 is a designator for the intended recipient(s) of the original communication. One or both of the source or destination systems 262-263 may be one or more of the Monitored Systems 105-107 within the Operating Domain 111, or an external system outside of the Operating Domain 111. The Action ID 264 is an identifier that corresponds to the command, action, or notification (collectively referred to as "actions") from the original communication. The Action Arguments 265 contain any additional relevant data, such as subcommands or arguments for the primary command that were part of the same original communication. Finally, the Time Stamp 266 includes the time at which the original communication was observed and captured by the State Machine Reference Monitor or external preprocessor.

The invention is not limited to the data structures shown in FIGS. 2A-2C. Further, the state entries and event data records may include different content without departing from the invention.

Figure 3:
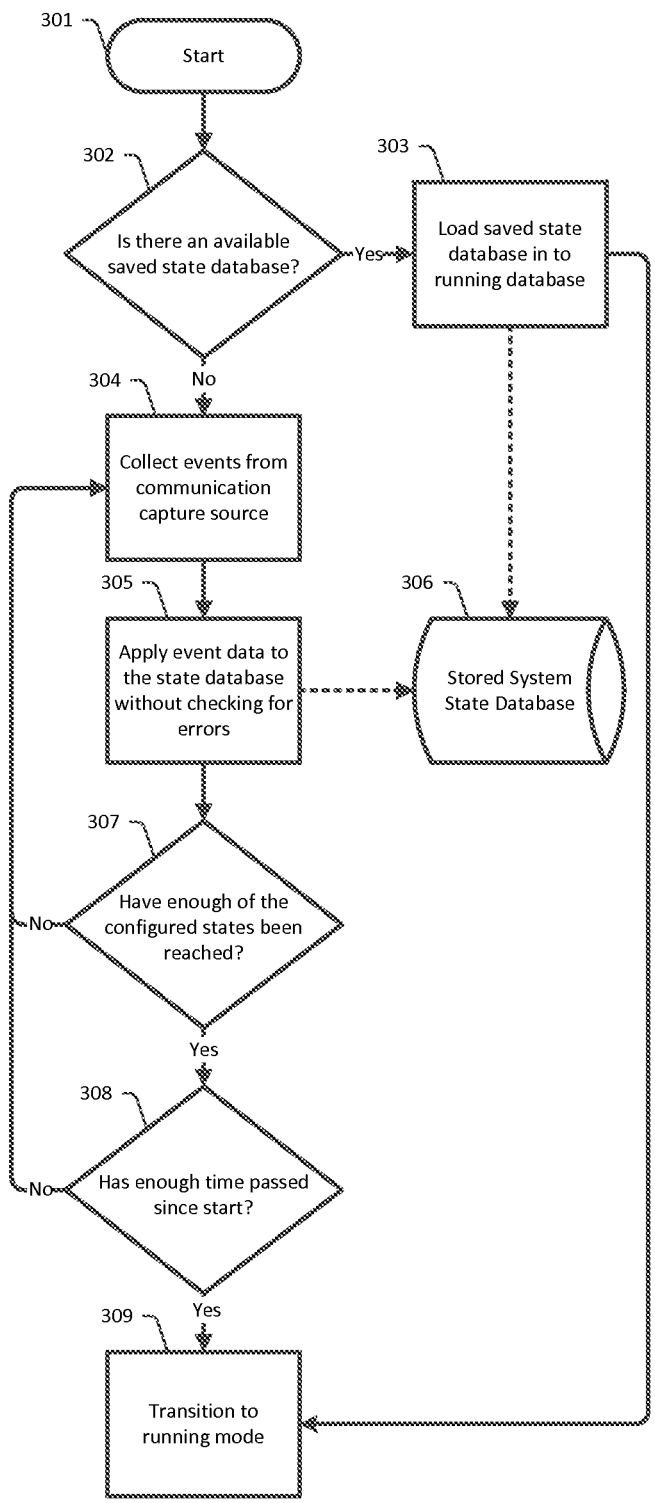
FIG. 3 shows a flowchart of the startup process in accordance with one or more embodiments of the invention.
Figure 4:
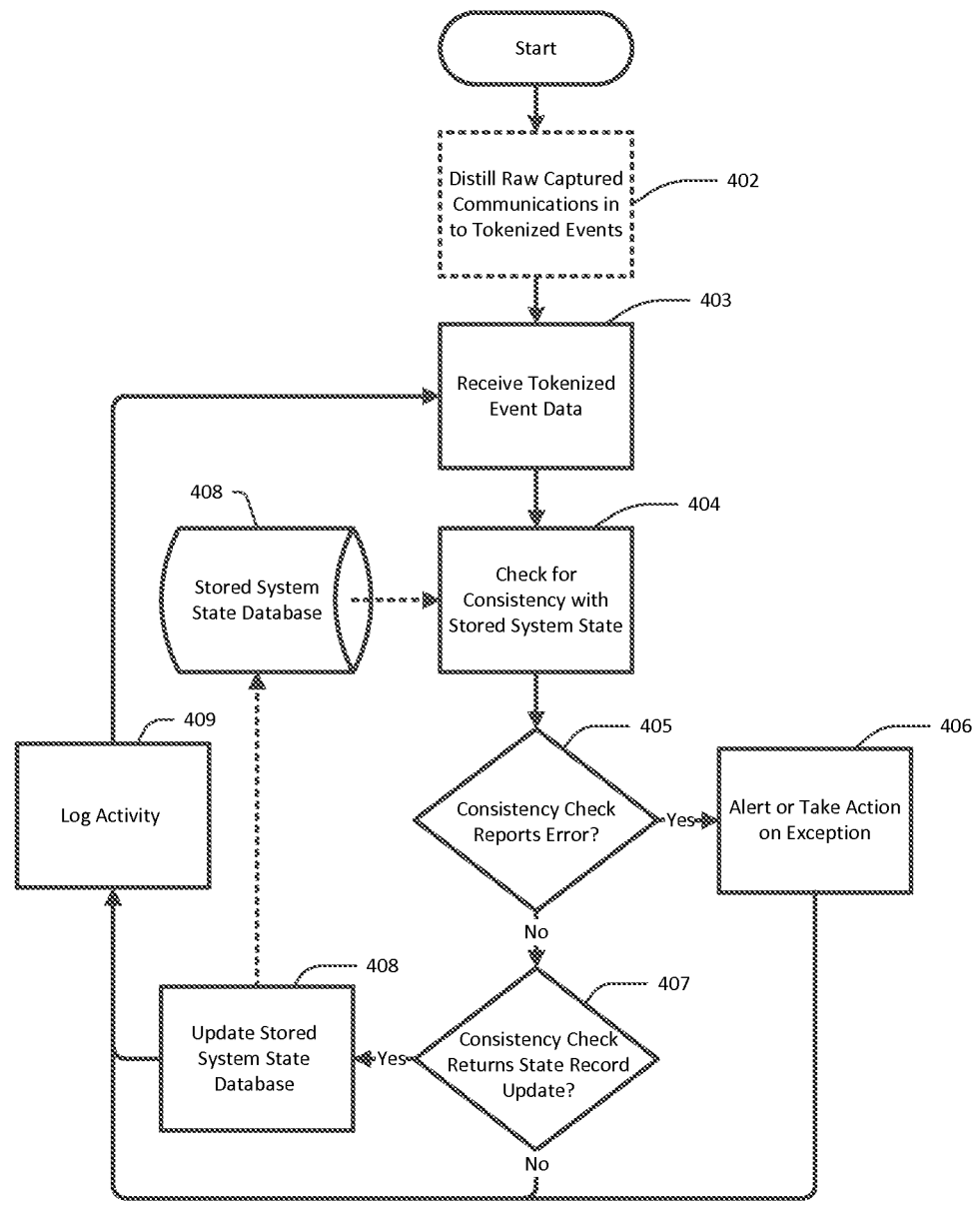
FIG. 4 shows a flowchart for the process of checking a new event against the state database in accordance with one or more embodiments of the invention.
Figure 5:
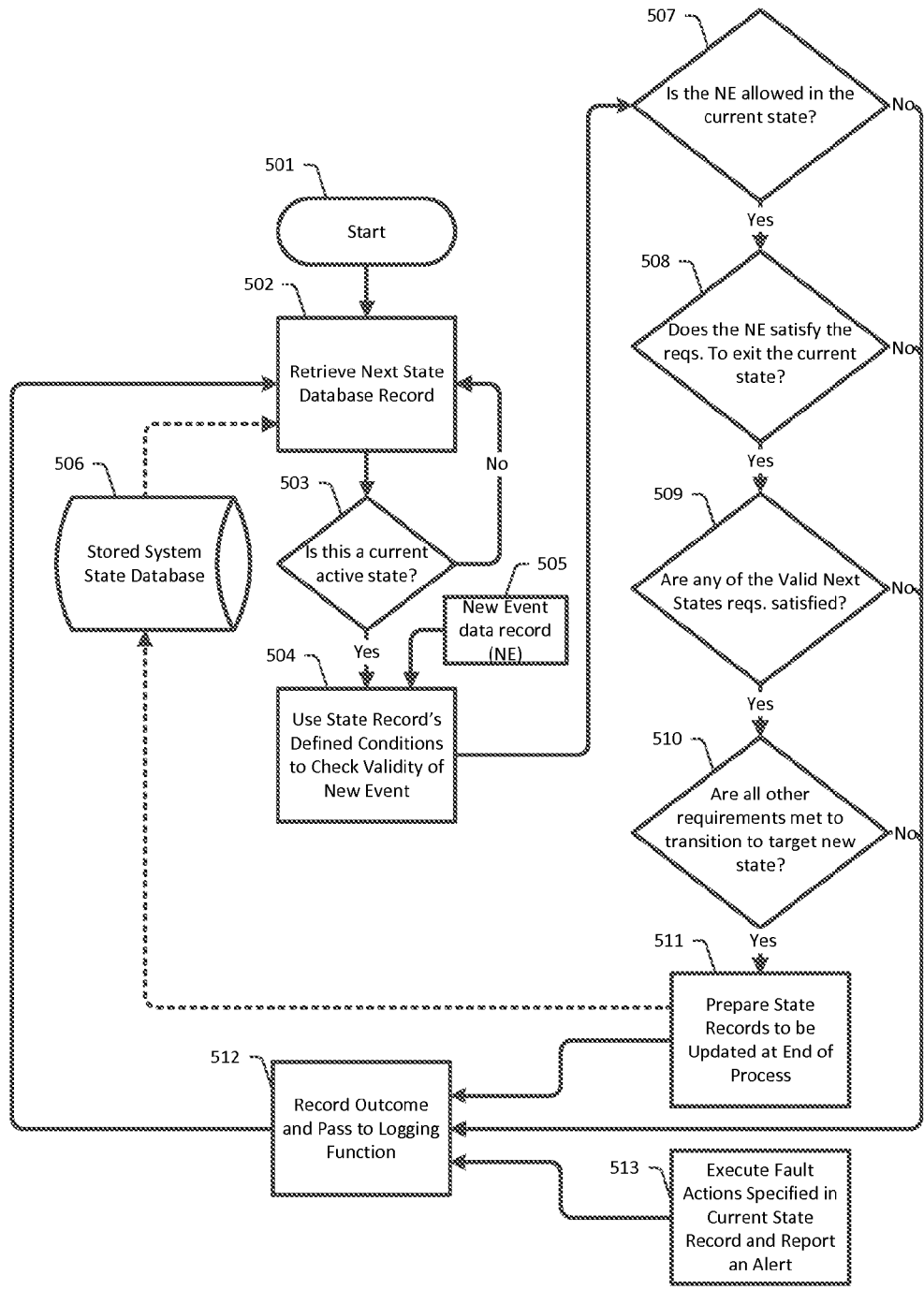
FIG. 5 shows a flowchart of checking state consistency in accordance with one or more embodiments of the invention.

FIGS. 3-5 show flowcharts in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel. In one embodiment of the invention, the methods shown in FIGS. 3-5 may be performed in parallel.

Referring to FIG. 5, the initialization process, illustrated in FIG. 3 is executed in one of two primary ways. The first option allows for the loading of existing state data (for example, from a suspended system, from an external monitoring tool, from an external simulation tool, or an equipment control tool) directly into the stored system state database 506. This is done by checking for the availability of stored state data to load in step 502. If true, then the data is loaded directly in to the database 306 in step 303, then the system is transitioned to a running state in step 309. The second option, where there is no preexisting data available, is to populate the state database 306 from zero by utilizing live captured communications. In step 304, the live captured communications are collected from the system's communication capture source (such as the monitor port 110 in FIG. 1). In one embodiment of the invention, the live captured communications corresponds to communications that are obtained from system that is current operating, where the communications are captured in real-time or near real-time from the operating domain. The captured communication is stored in the database (e.g., as event data records) in step 305 without alerting on exceptions. This allows for the database to become filled with current data, effectively "learning" the live environment of the operating domain 111 in FIG. 1 before transitioning to the normal running mode. In step 307, the database is queried to determine if a configured minimum and/or maximum threshold of states (generated using the event data records stored in step 305) have been reached using the live captured communications. If this condition has been met, then a timer, which started on the first iteration of step 304 is checked in step 308 to determine if the configured minimum and/or maximum amount of time has passed. If steps 307 and 503 are true, then a transition is made to normal running mode.

Referring to FIG. 4, in step 402, raw communications traffic received as an input in to the State Machine Reference Monitor may first need to be decoded and normalized before being used for logical operations. As an example, TCP/IP packets from an Ethernet network may be tracked and correlated in to individual conversations, then the payloads of each conversation may be combined and parsed to yield the commands and data that corresponds to the sources, destinations, and events used in the logical analysis that follows in the process. Different embodiments and implementations of the method, as well as the exact configuration of the logic trees used within the method may determine the extent and type of preprocessing necessary. Some protocols and communication types may require several layers of preprocessing, while others may require little or no preprocessing.

After the decoding process, communications may be distilled in to their component parts and normalized using implementation- and configuration-specific mappings. These mappings may assign consistent identifications to each part of the communications, effectively translating one or more protocols and command sets in to metadata that can be used for logical operations. For example, the MODBUS protocol, used in industrial process control applications, primarily uses a command and value" pairing for each message sent. As such, messages such as the simplified "set temperature 50F" would be broken down with "set" as the command portion, "temperature 50F" as the corresponding value. In an embodiment where MODBUS is one of the protocols used among the monitored systems, the State Machine Reference Monitor's preprocessor would assign each of the command portions of the observed messages a unique identification. This way, multiple similar commands from dissimilar systems that have different syntax or values in the communication protocols would be mapped to the same command code within the State Machine Reference Monitor.

Continuing with FIG. 4, event data is accepted 403 about an event that was observed and captured by the State Machine Reference Monitor, where it is passed to the consistency checker 404. Additional detail about the consistency checker is described below and in FIG. 5. The consistency checker 404 compares the data collected in step 403 to the state of the system stored in the database 408 then outputs any detected errors as well as any potential updates to the state database.

If the decoded received event data is found to be inconsistent with the expected system state in step 404, then the reported error is caught in decision step 405, and an alert is sent in step 406 using data from the consistency check process, to one or more external processes before returning to step 403. If the received and decoded network data is found to be consistent in step 404, and no errors are reported and caught in step 405, then processing continues with step 407, where it is determined if any state record updates are output by step 404. If so, then those updates are applied in step 408. If not, then no updates are made to the state database, and no alerts are raised before proceeding to step 409. Step 409 passes any activity data logged in steps 404-408 to the configured external logging mechanism (if any). This process runs as a loop without an exit condition, requiring manual startup and interruption for conditions outside of regular operation. Unless the monitored systems in the operating domain 111 in FIG. 1 are all simultaneously suspended before stopping the process, and the process then restarted before any of those systems were resumed, then the state database would fall out of synchronization with the operating domain, and need to be initialized again using the process in FIG. 3 before returning to normal running mode.

Referring to FIG. 5, this process starts with the first database record, and retrieves each successive one on every iteration in step 502. In some embodiments of the invention, this part of the process may be optimized by retrieving only changed records, or ones with other specific qualities, instead of traversing the entire database. Once a record is retrieved in step 502, step 503 assesses whether or not it is a currently active state, which is denoted in the State Activity Status field 252 of each State Entry 250 stored in the database. If the state record is an active state, processing continues. If not, the next record is retrieved in step 502. In step 504, the New Event (NE) record is compared to the state record from steps 502-503 using several logical operations in steps 507-510. These operations are fully configurable and may include additional logical operations in some embodiments of the invention, but may contain steps 507-510 as a minimum. Each operation uses information stored in the current state record's fields 251-257 to test against the fields 261-266 of the NE record 505. In step 507, the NE record is evaluated against the rules from the current state's record's Valid Actions Within State field 255. In step 508, the NE record is compared to determine if it satisfies the requirements listed in the State Exit Prerequisites field 254 and the State Entry Prerequisites fields 253 of the corresponding states listed in the Valid Next States field 257. In step 509, the states listed in the current state record's Valid Next States field 257 are evaluated to determine if the requirements in their respective State Entry Prerequisites fields 254 are satisfied by the NE record and current state's status. In step 510, any remaining requirements are checked using the configured data sources (such as state status from another logic tree, or an external data source). Because step 510 may include pulling data from other sources, it may include searches of the entire state database, and/or execution of external processes. For example, in step 510, a third-party data source or system may be queried to determine whether there are any other restrictions or reasons for not transitioning the system to a new current state or if there are any other reasons to trigger a fault action.

If step 507 is found to be false, then an exception is raised, and the instructions in the current state's State Fault Actions field 256 are executed in step 513. The exception is also reported using the configured set of alert reporting mechanisms, if any. Step 512 then logs the activity to the configured logging mechanism (if any), and continues back to step 502. If any of steps 508-510 are found to be false, then the activity is recorded and passed to the configured logging mechanism (if any) in step 512, and the process continues back to step 502. If steps 508-510 are all found to be true, then the NE record may be applied to the state database. Depending on the content of the NE record, one implementation of doing this may cause the current state record to be marked as inactive, and another state to then be marked as active, effectively transitioning the system from one state to another. In the same way, another state may be marked as active or inactive without affecting the current state. The structure of the logic tree and the configuration within each state record may determine how any given NE record affects the state database upon application. After any necessary changes to the database are prepared in step 511, the activity is recorded and passed to the configured logging mechanism (if any) in step 512, and the process continues back to step 502.

Those skilled in the art will appreciate that while the invention has been described with respect to capturing live communications and then processing the captured communications in real time or near real time, embodiments of the invention may be implemented using offline processing. In such cases, the captured communications are stored and then at some later point in time processed by the state machine reference monitor. The offline processing may be used, for example, for forensic analysis of a system after it has been breached.

FIGS. 6A-6F show examples in accordance with one or more embodiments of the invention. The example is not intended to limit the scope of the invention. Further, various components in the monitored systems have been omitted for purposes of clarity in FIGS. 6A-6F.

Consider a scenario in which a system includes an industrial process and the associated control equipment. As depicted in FIG. 6A, this exemplary system includes a valve and valve controller (A), a heater and heater controller (B), a control panel (C), a switched Ethernet network with Ethernet taps, and the invention implemented as a self-contained device (State Machine Reference Monitor). In this example, the operating domain may be all of the aforementioned components except the state reference monitor, the Ethernet tap, the Ethernet switch, and the light and siren. The controller devices (A, B, C) are all connected to the Ethernet switch through the Ethernet tap, which sends a copy of all traffic flowing through it to the State Machine Reference Monitor. The controller devices all communicate with each other using the same MODBUS protocol for all messages. The State Machine Reference Monitor is also connected to a siren and light, which act as a means for alerting when an error is detected.

Figure 6D:
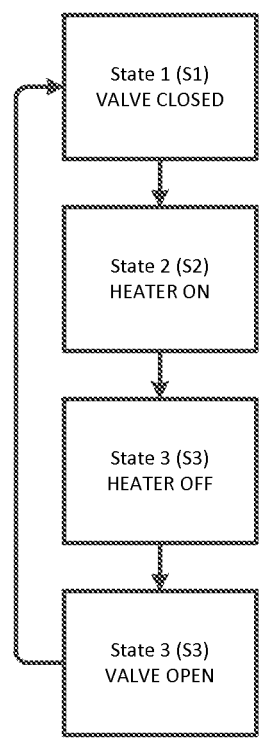

As depicted in FIG. 6D, this system (also referred to as the operating domain) has four (4) designed and desired states. These states are "VALVE CLOSED", "HEATER ON", "HEATER OFF", and "VALVE OPEN". These four states are configured as state entries in the State Machine Reference Monitor as depicted in FIG. 6B. State Entry S1 corresponds to "VALVE CLOSED". State Entry S2 corresponds to "HEATER ON". State Entry S3 corresponds to "HEATER OFF". State Entry S4 corresponds to "VALVE OPEN". As depicted in FIG. 6B, the logic tree contains all four state entries.

Figure 6E:
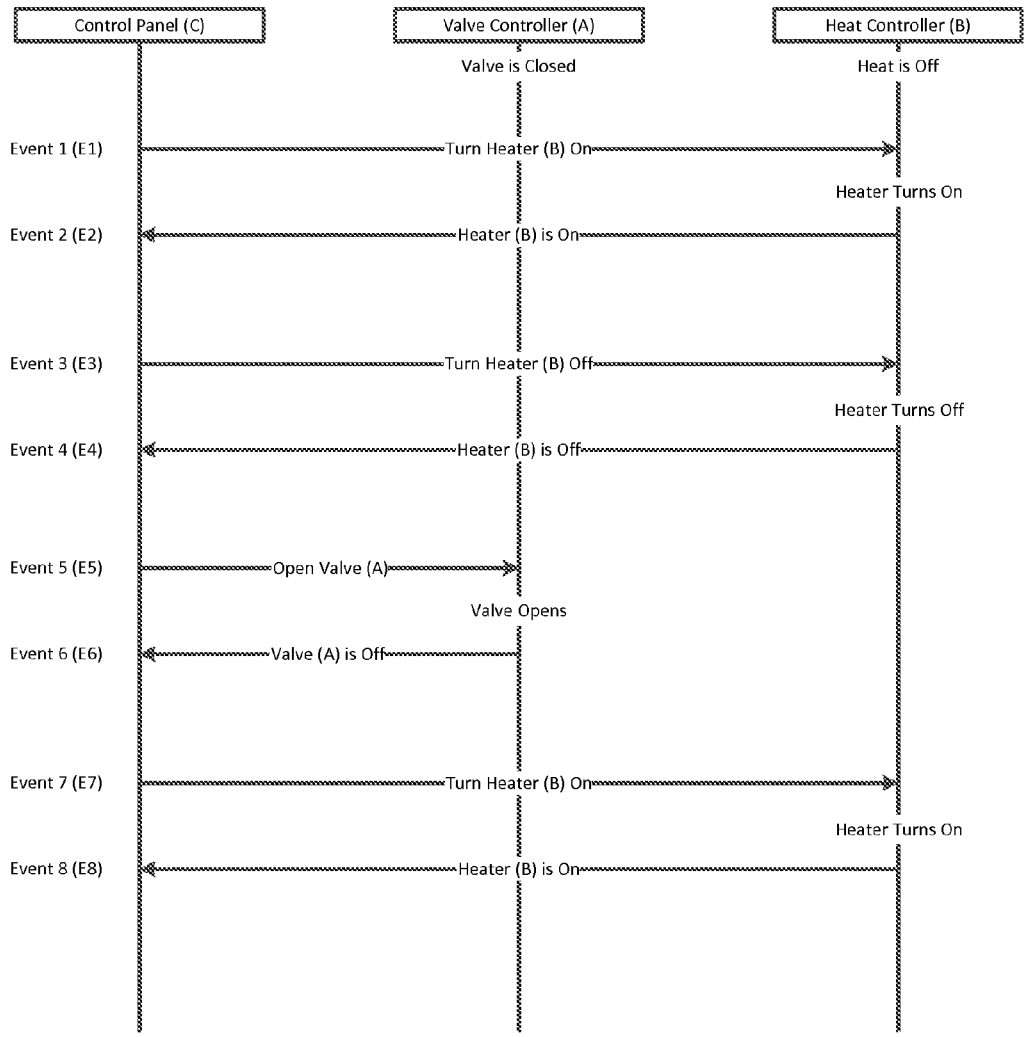

Referring to FIG. 6E, at some point in time, the Valve Controller (A), Heat Controller (B), and the Control Panel (C) are used to perform operations on the attached equipment, and do so by sending and receiving commands across the Ethernet network. Because of the configuration of the network, and specifically the inclusion of an Ethernet tap, all commands and messages sent and/or received by all equipment across the network are also received by the State Machine Reference Monitor. In this example, referring to FIG. 6D, the initial active state within the State Machine Reference Monitor is S1, the valve is closed (A), and the heater is off (B). Each command and message that follows is processed by the configured preprocessor within the State Machine Reference Monitor into event data records E1-E8, corresponding to Event 1-8 in FIG. 6E, respectively. This preprocessor receives the MODBUS packets sent over the Ethernet network and decodes them in to their component parts according to the various protocol specifications. Using the source and destination IP addresses from the IP packet header, the source and destination system IDs are assigned. The MODBUS protocol, consisting mainly of an Action and Argument pair for each packet are decoded and used for the corresponding Action ID and Action Arguments fields of the Event Data records.

The State Machine Reference Monitor's state database contains state records as described below.

In reference to FIG. 6C, S1 specifies the following: (i) State ID S1, which uniquely identifies the state in the logic tree, (ii) State Activity Status: Active, which marks this state as the initially active state, (iii) State Entry Prerequisites: Valve (A) Closed, (iv) State Exit Prerequisites: none, (v) Valid Actions Within State: Turn on Heater (B) and go to S2, (vi) State Fault Actions: Turn on Light and Siren, and (vii) Valid Next States: S2.

S2 specifies the following: (i) State ID S2, which uniquely identifies the state in the logic tree, (ii) State Activity Status: Inactive, which marks this state as initially inactive, (iii) State Entry Prerequisites: Heater (B) On, (iv) State Exit Prerequisites: none, (v) Valid Actions Within State: Turn of Heater (B) and go to S3, (vi) State Fault Actions: Turn on Light and Siren, and (vii) Valid Next States: S3.

S3 specifies the following: (i) State ID S3, which uniquely identifies the state in the logic tree, (ii) State Activity Status: Inactive, which marks this state as initially inactive, (iii) State Entry Prerequisites: Heater (B) Off, (iv) State Exit Prerequisites: none, (v) Valid Actions Within State: Open Valve (A) and go to S4, (vi) State Fault Actions: Turn on Light and Siren, and (vii) Valid Next States: S4.

S4 specifies the following: (i) State ID S4, which uniquely identifies the state in the logic tree, (ii) State Activity Status: Inactive, which marks this state as initially inactive, (iii) State Entry Prerequisites: Valve (A) Open, (iv) State Exit Prerequisites: none, (v) Valid Actions Within State: Close Valve (A) and go to S1, (vi) State Fault Actions: Turn on Light and Siren, and (vii) Valid Next States: S1.

The system depicted in FIG. 6A, communicating through the series of commands and messages depicted in FIG. 6E, represent, as an example, a segment of time in the system's regular operations. Initially, the valve and valve controller (A) are in the closed position; the heat controller (B) and heater are turned off; and the State Machine Reference Monitor denotes state S1 "VALVE CLOSED" as the current state. The state records S1-S4 are configured as described above.

From this point, the actions in FIG. 6E are executed. Each labeled event corresponds to a command or message that is visible to the State Machine Reference Monitor. Other responses and actions outside of those visible events are included purely for illustrative purposes. In Event 1 (E1), the Control Panel (C) issues a command to the Heat Controller (B) to turn on the heater. As a result, the heater is turned on. In response, in Event 2 (E2), the Heat Controller (B) sends a status message back to the Control Panel (C) notifying it that the heater is currently on.

In Event 3 (E3), the Control Panel (C) issues a command to the Heat Controller (B) to turn off the heater. As a result, the heater is turned off. In response, in Event 4 (E4), the Heat Controller (B) sends a status message back to the Control Panel (C) notifying it that the heater is currently off.

In Event 5 (E5), the Control Panel (C) issues a command to the Valve Controller (A) to open the valve. As a result, the valve is opened. In response, in Event 6 (E6), the Valve Controller (A) sends a status message back to the Control Panel (C) notifying it that the valve is currently closed.

In Event 7 (E7), the Control Panel (C) issues a command to the Heat Controller (B) to turn on the heater. As a result, the heater is turned on. In response, in Event 8 (E8), the Heat Controller (B) sends a status message back to the Control Panel (C) notifying it that the heater is currently on.

Having observed and captured the communications generated in the above events, the State Machine Reference Monitor's preprocessor creates the following Event Data records:

Referring to FIG. 6F, Event Data E1 specifies the following: (i) Event ID E1, which uniquely identifies the event data record, (ii) Source System ID C, which indicates that the Control Panel (C) was the origin of the communication, (iii) Destination System ID B, which indicates that the Heater Controller (B) is the intended recipient of the communication, (iv) Action ID: Heat-Turn-On, which refers to the command telling the heater controller to turn on the heater, (v) Action Arguments: none, and (vi) Time Stamp 10, which is the time at which the communication was received.

Event Data E2 specifies the following: (i) Event ID E2, which uniquely identifies the event data record, (ii) Source System ID B, which indicates that the Heater Controller (B) was the origin of the communication, (iii) Destination System ID C, which indicates that the Control Panel (C) is the intended recipient of the communication, (iv) Action ID: Heat-Status, which refers to an indication of the heater's status is to follow in the Action Arguments, (v) Action Arguments: On, which indicates the heater as being on, and (vi) Time Stamp 20, which is the time at which the communication was received.

Event Data E3 specifies the following: (i) Event ID E3, which uniquely identifies the event data record, (ii) Source System ID C, which indicates that the Control Panel (C) was the origin of the communication, (iii) Destination System ID B, which indicates that the Heater Controller (B) is the intended recipient of the communication, (iv) Action ID: Heat-Turn-Off, which refers to the command telling the heater controller to turn off the heater, (v) Action Arguments: none, and (vi) Time Stamp 30, which is the time at which the communication was received.

Event Data E4 specifies the following: (i) Event ID E4, which uniquely identifies the event data record, (ii) Source System ID B, which indicates that the Heater Controller (B) was the origin of the communication, (iii) Destination System ID C, which indicates that the Control Panel (C) is the intended recipient of the communication, (iv) Action ID: Heat-Status, which refers to an indication of the heater's status is to follow in the Action Arguments, (v) Action Arguments: Off, which indicates the heater as being off, and (vi) Time Stamp 40, which is the time at which the communication was received.

Event Data E5 specifies the following: (i) Event ID E5, which uniquely identifies the event data record, (ii) Source System ID C, which indicates that the Control Panel (C) was the origin of the communication, (iii) Destination System ID A, which indicates that the Valve Controller (A) is the intended recipient of the communication, (iv) Action ID: Valve-Open, which refers to the command telling the valve controller to open the valve, (v) Action Arguments: none, and (vi) Time Stamp 50, which is the time at which the communication was received.

Event Data E6 specifies the following: (i) Event ID E6, which uniquely identifies the event data record, (ii) Source System ID A, which indicates that the Valve Controller (A) was the origin of the communication, (iii) Destination System ID C, which indicates that the Control Panel (C) is the intended recipient of the communication, (iv) Action ID: Valve-Status, which refers to an indication of the valve's status is to follow in the Action Arguments, (v) Action Arguments: Open, which indicates the valve as being open, and (vi) Time Stamp 60, which is the time at which the communication was received.

Event Data E7 specifies the following: (i) Event ID E7, which uniquely identifies the event data record, (ii) Source System ID C, which indicates that the Control Panel (C) was the origin of the communication, (iii) Destination System ID B, which indicates that the Heater Controller (B) is the intended recipient of the communication, (iv) Action ID: Heat-Turn-On, which refers to the command telling the heater controller to turn on power to the heater, (v) Action Arguments: none, and (vi) Time Stamp 70, which is the time at which the communication was received.

Event Data E8 specifies the following: (i) Event ID E8, which uniquely identifies the event data record, (ii) Source System ID B, which indicates that the Heater Controller (B) was the origin of the communication, (iii) Destination System ID C, which indicates that the Control Panel (C) is the intended recipient of the communication, (iv) Action ID: Heat-Status, which refers to an indication of the heater's status is to follow in the Action Arguments, (v) Action Arguments: On, which indicates the heater as being on, and (vi) Time Stamp 80, which is the time at which the communication was received.

In processing each event record as it was received, the State Machine Reference Monitor assesses each Event Data record in order against the set of state records. In this example, given the starting conditions, state records, and event records detailed above, the State Machine Reference Monitor performs the course of action that follows.

Upon receiving Event Data record E1, E1 is compared to the current active state (S1). Because E1 contains the command to turn on the heater, and S1 lists this as an allowed action, processing continues. Because the action in E1 was also linked to a state transition to S2 in S1's record, S2's record is assessed to determine whether or not all the criteria for a state transition have been satisfied. Because they have not, the State Machine Reference Monitor marks S2's status as pending completion and waits. When E2, which contains confirmation of the heater's having been turned on, is received, the State Machine Reference Monitor completes the transition to S2, as the state entry prerequisite for S2 is that the heater is on. The transition being complete, S1 is marked as inactive, and S2 is marked as active.

Upon receiving Event Data record E3, E3 is compared to the current active state (S2). Because E3 contains the command to turn on the heater off, and S2 lists this as an allowed action, processing continues. Because the action in E3 was also linked to a state transition to S3 in S2's record, S3's record is assessed to determine whether or not all the criteria for a state transition have been satisfied. Because they have not, the State Machine Reference Monitor marks S3's status as pending completion and waits. When E4, which contains confirmation of the heater's having been turned off, is received, the State Machine Reference Monitor completes the transition to S3, as the state entry prerequisite for S3 is that the heater is off. The transition being complete, S2 is marked as inactive, and S3 is marked as active.

Upon receiving Event Data record E5, E5 is compared to the current active state (S3). Because E5 contains the command to open the valve, and S3 lists this as an allowed action, processing continues. Because the action in E5 was also linked to a state transition to S4 in S2's record, S4's record is assessed to determine whether or not all the criteria for a state transition have been satisfied. Because they have not, the State Machine Reference Monitor marks S4's status as pending completion and waits. When E6, which contains confirmation of the valve being opened, is received, the State Machine Reference Monitor completes the transition to S4, as the state entry prerequisite for S4 is that the valve is open. The transition being complete, S3 is marked as inactive, and S4 is marked as active.

Upon receiving Event Data record E7, E7 is compared to the current active state (S4). Because E7 contains the command to turn on the heater, and S4 does not list this as an allowed action, S4's State Fault Actions are executed, and the light and siren are activated.

In this example system and scenario, notification is the only possible course of action when a fault is encountered. As such, E7 and E8 are successfully executed on the monitored equipment, and the undesirable results may still occur.

One or more embodiments of the invention provides improved protection against one or more of the following: (i) sophisticated, advanced malware not detected by anti-virus software, (ii) targeted attacks directed by adversaries at a particular target, and (iii) "Insider attacks" made by knowledgeable employees or personnel, in particular privileged network administrators possessing full administrative access to parts or all of the network. Specifically, one or more embodiments of the invention improve protection of systems (and subsystems) by one or more of the following mechanisms: (a) locating the state reference monitor off the network, not on it, making it immune to targeted attacks and circumvention; (b) tracking and analyzing expected versus actual data application and equipment states across multiple dissimilar systems and network segments, and/or (c) tracking and analyzing network communication states across multiple dissimilar systems and network segments.

In one or more embodiments of the invention, the logic programmed in the state machine reference monitor could be as simple or complex as is necessary, and may include inputs from as many systems or other network security monitoring devices as necessary for the environment to be monitored. The logic could mix inputs from external systems with internally tracked information, such as counters, timers, calendars, or other useful information for better determining network, attached equipment, and data states.

While a given attack vector may be successfully detected or halted by the method, an advanced attacker may use many diverse attacks simultaneously to attempt to avoid detection and increase the probability of a successful system compromise without detection. In many of the more advanced cases that have been studied, a lack of isolation on various network layers was to credit for the success of such attacks. To combat this, in in or more embodiments of the invention, the state machine reference monitor may be implemented in isolation from the systems that are to be protected, where such isolation may extend to all three realms of security: electronic, physical, and human. Electronic isolation may involve a fully separate network for security operations, only interfacing with the primary production network via extremely limited connections. Physical isolation may involve a fully separate physical network infrastructure, as well as separate location and set of physical security controls for any hardware embodiment and supporting systems. Human isolation may extend through the host organization, and include a fully separate set of personnel for monitoring security and responding to alerts raised by the system.

Figure 7:
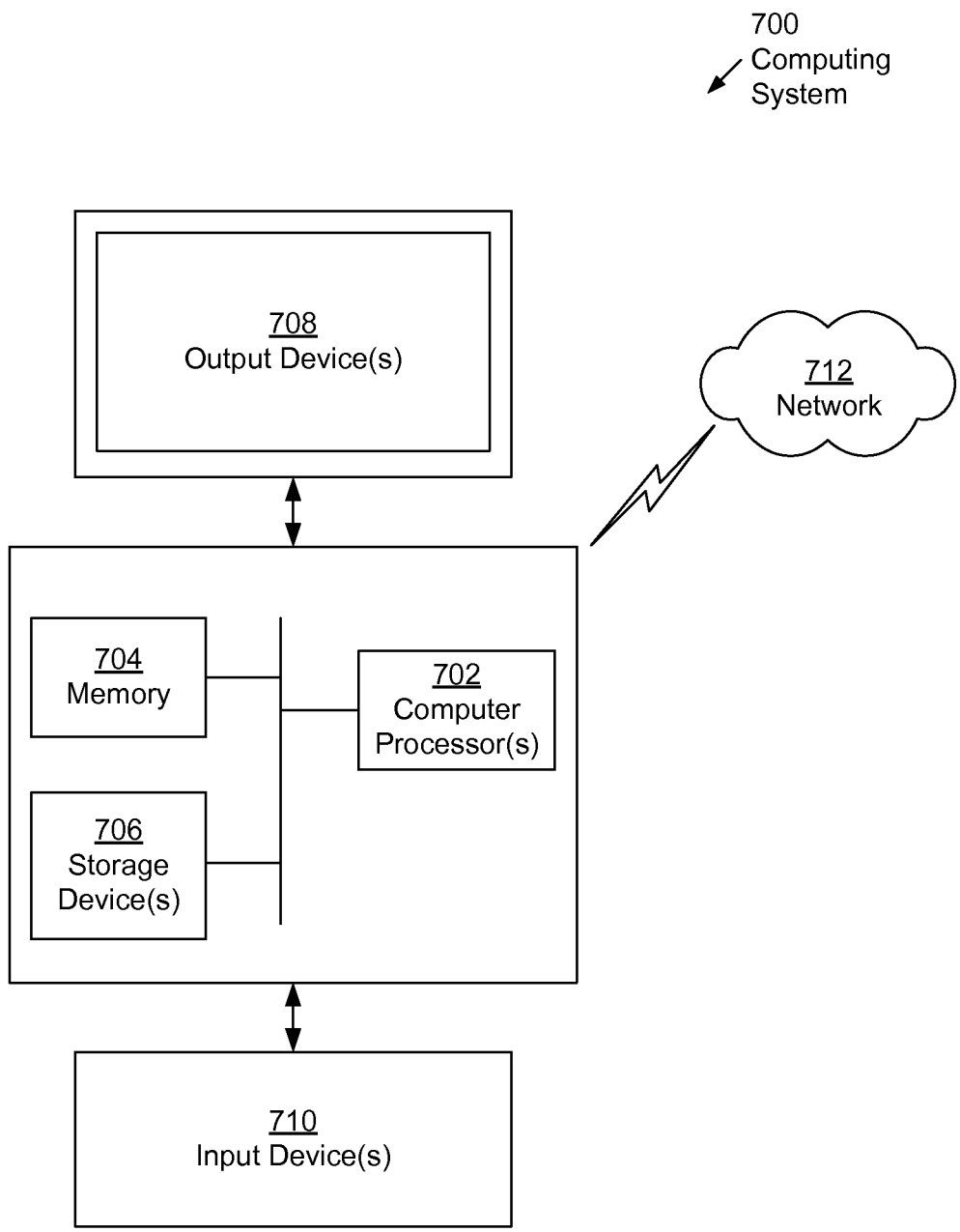
FIG. 7 shows a computer system for implementing the invention in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 7, the computing system (700) may include one or more computer processor(s) (702), associated memory (704) (e.g., random access memory (RAM), cache memory, flash memory, etc.), one or more storage device(s) (706) (e.g., a hard disk, an optical drive such as a compact disk (CD) drive or digital versatile disk (DVD) drive, a flash memory stick, etc.), and numerous other elements and functionalities. The computer processor(s) (702) may be an integrated circuit for processing instructions. For example, the computer processor(s) may be one or more cores, or micro-cores of a processor. The computing system (700) may also include one or more input device(s) (710), such as a touchscreen, keyboard, mouse, microphone, touchpad, electronic pen, or any other type of input device. Further, the computing system (700) may include one or more output device(s) (708), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (700) may be connected to a network (714) (e.g., a local area network (LAN), a wide area network (WAN) such as the Internet, mobile network, or any other type of network) via a network interface connection (not shown). The input and output device(s) may be locally or remotely (e.g., via the network (712)) connected to the computer processor(s) (702), memory (704), and storage device(s) (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (700) may be located at a remote location and connected to the other elements over a network (714). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising instructions, which when executed by a processor perform a method, the method comprising:
   receiving a first captured communication;
   generating a first event data record corresponding to the first captured communication, wherein the first event data record identifies a source system of the first captured communication, a destination system of the first captured communication, and a first action to be performed at the destination system, wherein the first action is obtained from the first captured communication;
   identifying a first state of an operating domain, wherein the operating domain comprises at least one selected from a group consisting of the source system and the destination system, and wherein the first state is a current active state of the operating domain and is associated with a first state entry;
   making, using the first state entry, a first determination that the first action is not permitted while the operating domain is in the first state;
   based on the first determination, performing a state fault action;
   receiving a second captured communication;
   generating a second event data record corresponding to the second captured communication, wherein the second event data record identifies the source system, a second destination system in the operating domain, and a second action to be performed at the second destination system, wherein the second action is obtained from the second captured communication;
   making, using the first state entry, a second determination that the second action is permitted for the current active state of the operating domain;
   receiving a third captured communication;
   generating a third event data record corresponding to the third captured communication, wherein the third event data record identifies the second destination system, and a third action performed at the second destination system, wherein the third action is obtained from the third captured communication; and
   making, using the first state entry, a third determination that the operating domain can transition the current active state to a new current active state,
   in response to the third determination:
      obtaining a second state entry corresponding to the new current active state;
      updating the second state entry to indicate that the second state is the new current active state of the operating domain; and
      updating the first state entry to indicate that the first state is not an active state of the operating domain.

2. The non-transitory computer readable medium of claim 1, wherein the source system is a monitored system within the operating domain and the destination system is external to the operating domain.

3. The non-transitory computer readable medium of claim 1, wherein the source system is a monitored system within the operating domain and the destination system is a second monitored system within the operating domain.

4. The non-transitory computer readable medium of claim 1, wherein the source system is a monitored subsystem within the operating domain.

5. The non-transitory computer readable medium of claim 1, wherein the operating domain is a single physical system, wherein the source system is a monitored system within the single system and the destination system is a second monitored subsystem within the single system.

6. The non-transitory computer readable medium of claim 1, wherein the first state is one of a plurality of states, wherein the operating domain may be in at least one of the plurality of states.

7. The non-transitory computer readable medium of claim 6, wherein each of the plurality of states corresponds to an allowed state of the operating domain.

8. The non-transitory computer readable medium of claim 6, wherein at least a portion of the plurality of states is associated with a logic tree, wherein each state associated with the logic tree specifies at least one other state associated with the logic tree as a next valid state of the operating domain.

9. The non-transitory computer readable medium of claim 1, wherein the first state is one of a plurality of states, wherein the operating domain may be in at least two of the plurality of states.

10. A state machine reference monitor, comprising:
   a monitor port operatively connected to an operating domain;
   a processor;
   a memory comprising instructions, which when executed by the processor perform a method, the method comprising:
      receiving a first captured communication via the monitor port;
      generating a first event data record corresponding to the first captured communication, wherein the first event data record identifies a source system of the first captured communication, a destination system of the first captured communication, and a first action to be performed at the destination system, wherein the first action is obtained from the first captured communication;
      identifying a first state of the operating domain, wherein the operating domain comprises at least one selected from a group consisting of the source system and the destination system, and wherein the first state is a current active state of the operating domain and is associated with a first state entry;
      making, using the first state entry, a first determination that the first action is not permitted while the operating domain is in the first state; and
      based on the first determination, performing a state fault action;
      receiving a second captured communication;
      generating a second event data record corresponding to the second captured communication, wherein the second event data record identifies the source system, a second destination system in the operating domain, and a second action to be performed at the second destination system, wherein the second action is obtained from the second captured communication;
      making, using the first state entry, a second determination that the second action is permitted for the current active state of the operating domain;
      receiving a third captured communication;
      generating a third event data record corresponding to the third captured communication, wherein the third event data record identifies the second destination system, and a third action performed at the second destination system, wherein the third action is obtained from the third captured communication; and
      making, using the first state entry, a third determination that the operating domain can transition the current active state to a new current active state, in response to the third determination:
- obtaining a second state entry corresponding to the new current active state;
- updating the second state entry to indicate that the second state is the new current active state of the operating domain; and
- updating the first state entry to indicate that the first state is not an active state of the operating domain.

11. The state machine reference monitor of claim 10, wherein the first state is one of a plurality of states, wherein the operating domain may be in at least one of the plurality of states, wherein the state machine reference monitor is external to the operating domain, wherein the state machine reference monitor is configured to determine the plurality of states for the operating domain.

12. The state machine reference monitor of claim 11, wherein the state machine monitor determines the plurality of states using at least one selected from a group consisting previously captured communications from the operating domain and live captured communications from the operating domain.

13. The state machine reference monitor of claim 10, wherein the state machine reference monitor is embedded in a physical device, wherein the operating domain comprises components within the physical device, wherein the state machine reference monitor is external the operating domain.

14. The state machine reference monitor of claim 13, wherein the physical device is one selected from a group consisting of a mobile device, a server, a laptop, a switch, a router, a wireless access point, and a desktop computer.

15. The state machine reference monitor of claim 10, wherein the first captured communication is one selected from a group consisting of network communication, communication from Supervisory Control and Data Acquisition (SCADA) system, communication from a Distributed Control System (DCS), communications under the PCIe protocol, communications under the PCI protocol, and communications under the Infiniband protocol.

16. The state machine reference monitor of claim 10, wherein the monitor port is configured to receive a copy of all communications between systems in the operating domain.

* * * * *